(12) United States Patent
Wade (10) Patent No.: US 9,717,371 B2
(45) Date of Patent: Aug. 1, 2017

(54) PORTABLE FLOW SINK (71) Applicant: Martin Aaron Wade, Knoxville, TN (US)

(72) Inventor: Martin Aaron Wade, Knoxville, TN (US)

( * ) Notice: Subject to any disclaimer, the term of this patent is extended or adjusted under 35 U.S.C. 154(b) by 179 days.

(21) Appl. No.: 14/121,255

(22) Filed: Aug. 14, 2014

(65) Prior Publication Data
US 2016/0045077 A1 Feb. 18, 2016

(51) Int. Cl.
*A47K 1/02* (2006.01)
*G05D 9/02* (2006.01)

(52) U.S. Cl.
CPC ...... *A47K 1/02* (2013.01); *G05D 9/02* (2013.01)

(58) Field of Classification Search
CPC ..... A47K 1/02; A47L 13/50; F16L 43/00; G05D 9/02
USPC .............................. 4/624–626; 137/140, 151
See application file for complete search history.

(56) References Cited

U.S. PATENT DOCUMENTS

| | | | | |
|---|---|---|---|---|
| 2,818,877 A * | 1/1958 | Swanson | ............ | A01G 27/001 137/135 |
| 3,045,252 A * | 7/1962 | Sorrells | ................ | A47L 13/50 4/626 |
| 3,594,830 A * | 7/1971 | Clifton | ................. | E03C 1/18 4/625 |
| 4,129,140 A * | 12/1978 | Carlin | ................ | F04F 10/00 137/124 |
| 4,631,760 A * | 12/1986 | Leishman | ............ | E03D 1/16 4/300 |
| 5,293,894 A * | 3/1994 | Fleischmann | ....... | F04F 10/00 137/135 |
| 5,706,678 A | 1/1998 | Sasaki | | |
| 5,718,847 A * | 2/1998 | Koble, Jr. | ............. | F28F 25/00 137/107 |
| 5,918,323 A * | 7/1999 | Smith | ................ | A61J 19/04 4/262 |
| 6,012,481 A * | 1/2000 | Lenart | ................ | A01K 7/04 137/142 |
| 6,513,177 B1 * | 2/2003 | Beveridge | ............ | E03C 1/16 4/624 |
| 7,533,426 B2 | 5/2009 | Pondelick | | |
| 7,730,561 B2 | 6/2010 | Kostelyk | | |
| 8,033,486 B2 | 10/2011 | Berger | | |
| 2012/0273060 A1 | 11/2012 | Makaitan | | |

FOREIGN PATENT DOCUMENTS

NL 8402563 A 8/1984
WO WO 8903917 A1 5/1989

* cited by examiner

*Primary Examiner* — J. Casimer Jacyna
(74) *Attorney, Agent, or Firm* — Robert J. Lauf (57) ABSTRACT

A portable sink includes a container for holding wash water, an inlet line to bring fresh water into the container, and an outlet line to remove wastewater from the container. A float valve on the inlet line maintains wash water at a selected level within the container. A faucet attached to the float valve may further provide a separate source of clean water to the user. The outlet line further includes a siphon to draw the wastewater from the container to a selected discharge location. The sink may be provided with one or more handles and/or a caster assembly or dolly for ease of movement about the work area. The siphon preferably includes an airlock to prevent the ingress of air at the discharge end under conditions of less than maximum flow.

6 Claims, 8 Drawing Sheets

FIGURE 1A

Top

FIGURE 1B

Bottom

PORTABLE FLOW SINK

BACKGROUND OF THE INVENTION

Field of the Invention

The invention pertains to apparatus and methods for handling wash water, and more particularly to portable sinks equipped with running water.

Description of Related Art

In the fields of building maintenance and remodeling, there are many occasions when a water supply is needed to perform cleaning operations. For simple cleaning jobs, a single bucket of water might suffice; however, for tasks like cleaning excess grout from newly-laid tile or paving stones, the wash water very quickly becomes filled with powder and therefore must be replenished frequently. This involves repeated trips to an appropriate place to dump the wastewater (generally outdoors) and refill the bucket.

What is needed is, first, a conveniently portable sink with the ability to replenish the water as needed, while safely discharging the wastewater stream to the outdoors, and second, a means of controlling the inlet and outlet flows to any selected flow rate for either a continuous or periodic replenishment of the water in the sink.

OBJECTS AND ADVANTAGES

Objects of the present invention include the following: providing a portable wash sink having controlled inlet and outlet flows; providing a portable wash sink that can be used indoors while discharging wastewater to the outdoors; providing a portable wash sink having a drain that acts as a controlled siphon; providing a portable wash sink in which the siphon action of the drain line can be stopped and started without the siphon running dry; providing a portable wash sink with valves to maintain selected inlet and outlet flows, prime the siphon in the drain line, and maintain a desired water level in the sink at all times; providing a siphon with a backflow preventive feature; and, providing a siphon that can be valved to reduce the fluid flow without having air enter the discharge side and thereby drain the siphon. These and other objects and advantages of the invention will become apparent from consideration of the following specification, read in conjunction with the drawings.

SUMMARY OF THE INVENTION

According to one aspect of the invention, a portable sink comprises: a container for holding wash water; an inlet line to bring fresh water into the container; a float valve on the inlet line to maintain the wash water at a selected level within the container; and, an outlet line to remove wastewater from the container, the outlet line further comprising an airlock device at the discharge end to prevent air from coming up the discharge line.

According to another aspect of the invention, a siphon for conveying fluid from a higher to a lower elevation comprises: an inlet opening through which fluid enters the siphon at the higher elevation; a tube of sufficient length to reach a selected discharge area at a lower elevation; an airlock device at the discharge end of the tube that prevents the backflow of air into the tube under conditions of less than maximum flow; and, a valve in the tube proximate to the inlet that allows the flow rate to be controlled to a desired value from zero to the maximum natural flow rate of the siphon while the airlock prevents the inflow of air.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIG. 1 is a schematic diagram of one example of the present invention, in which 1A is a cross-section viewed from the side, 1B and 1C are plan views from top and bottom, respectively.

FIG. 3 is a schematic diagram of possible water flow paths in accordance with another example of the invention.

DETAILED DESCRIPTION OF THE INVENTION

Figure 1A:
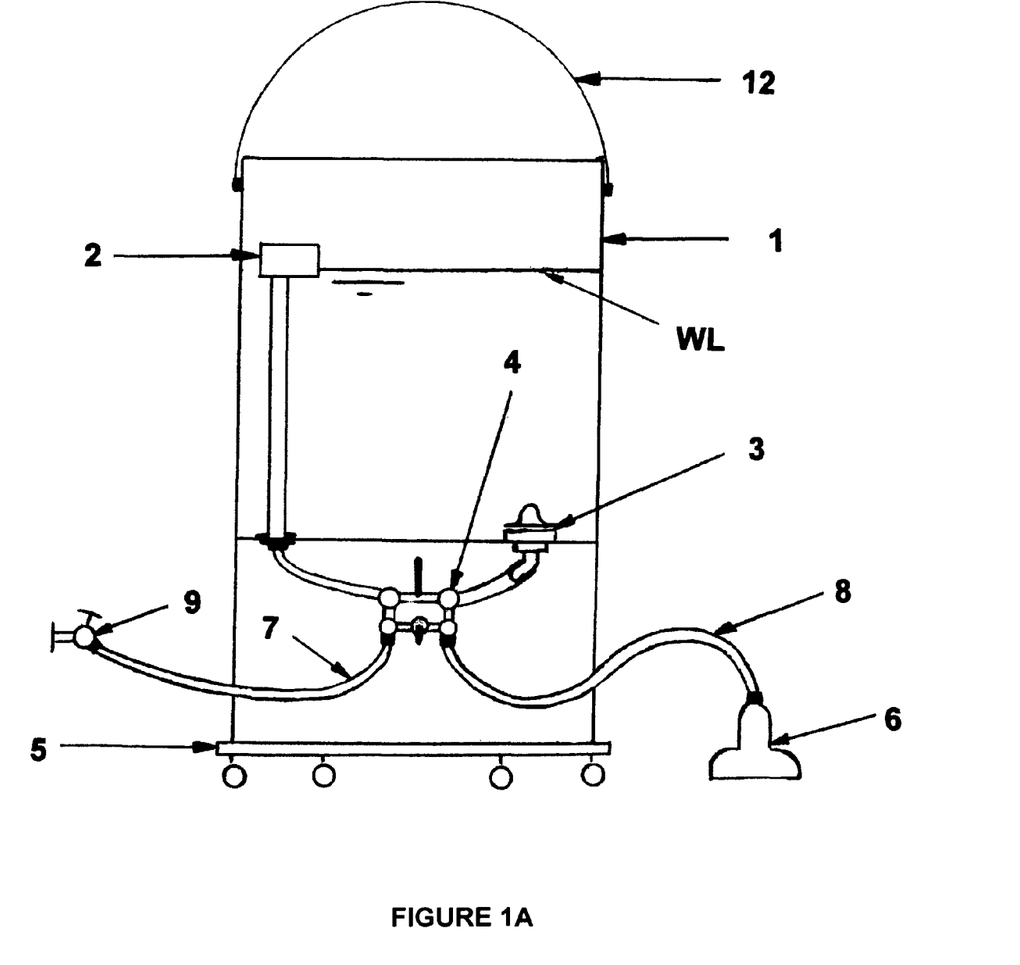
Figure 1B:
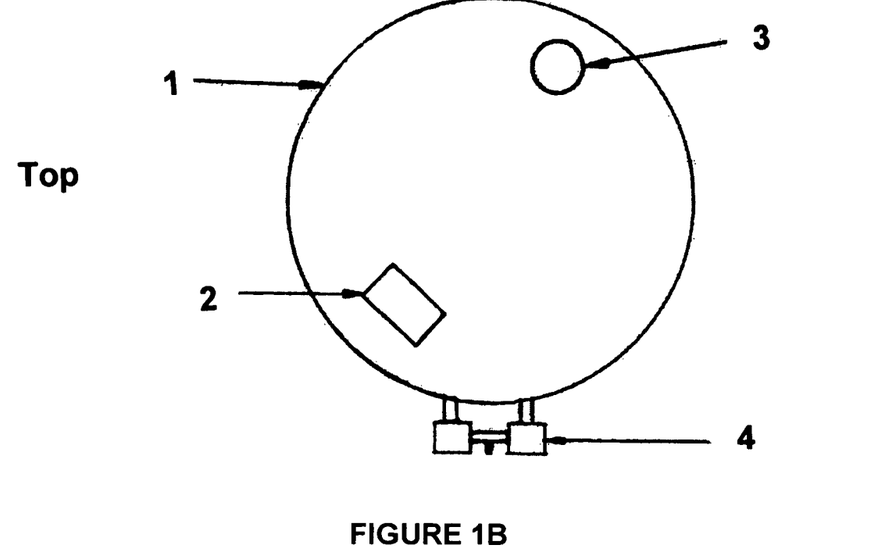
Figure 1C:
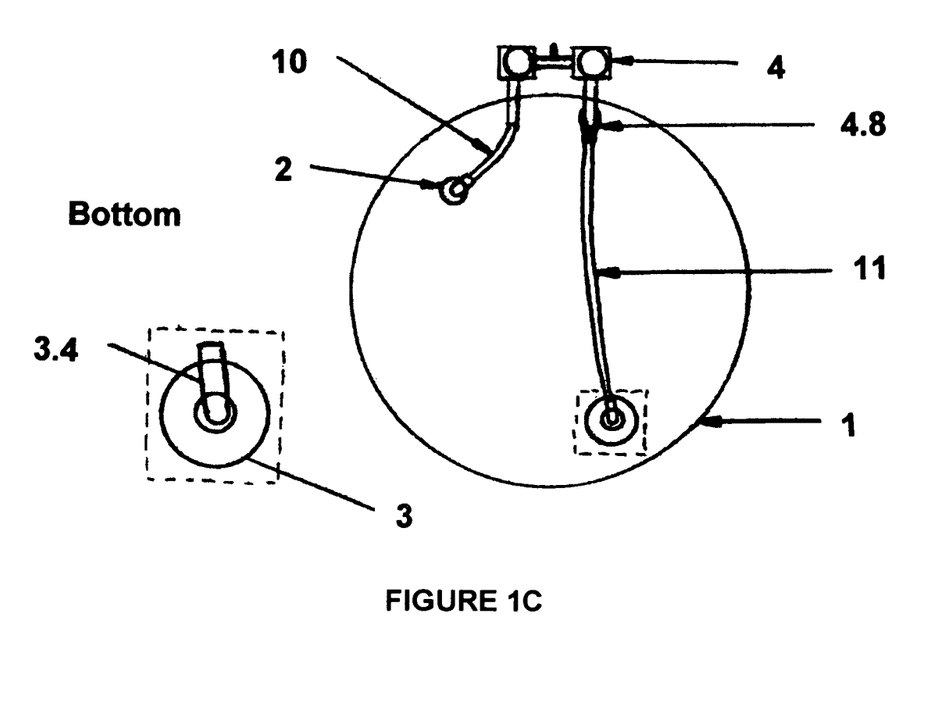

Referring to FIG. 1, in its most general form, the invention includes a bucket or other suitable container that has water inlet and outlet lines that may be valved separately or in tandem. A float valve 2 is provided to maintain a selected water level WL in the container. The outlet line 8 is preferably configured as a siphon to help draw the wastewater from the container and discharge it at a lower level, typically out of doors. The siphon preferably includes an airlock device 6 at the discharge end to prevent the ingress of air into the line under less than maximum flow conditions. A valve may optionally be provided to introduce inlet water into the outlet tube in order to prime the siphon before use. The container may be provided with carrying handle 12 and/or a caster assembly or dolly 5 for ease of portability.

The operation of the inventive device may be summarized as follows: Pressurized water is provided by a common water hose valve 9. The pressurized water is transported through a kink resistant water hose 7 to the valve unit 4. This valve unit has two valves that control the flow sink. The first valve is the priming valve 4.4. This valve is used to prime drain hose 8, filling it with water and removing all air from this hose. After priming is completed, the prime valve is turned off and the flow sink is ready to be used. By turning on the control lever 4.1 both the water inlet and drain are opened simultaneously. Water flows through the water line 10 to the water level controller 2 into the bucket/housing 1. The height of the water WL can be controlled by adjusting the level controller 2. The water level controller keeps a set amount of water in the flow sink even as the water is at the same time draining.

As water is flowing into and out of the flow sink, dirty water is being diluted. Dirt is settling to the bottom of the flow sink and being pulled out through the drain.

The wastewater passes through bung adaptor 3. The bung adaptor assures a leak proof exit for the dirty water out of the bucket 1. A filter is preferably disposed ahead of the bung adaptor in order to prevent larger debris from entering the outlet line and possibly clogging the valve or the airlock. Dirty water flows from the bung adaptor to a 90 degree line adaptor 3.4, through a ½" clear water line 11, through a straight drain line connector 4.8, to the opposite side of the washing machine single lever valve 4.2. Water moves past the priming valve 4.4 to the kink resistant water hose used as the drain hose 8. This hose is at this time, full of water and contains no air. Gravity acting on the water inside of the drain hose causes a suction/vacuum pulling the dirty water out of the flow sink. The wastewater travels through the drain hose to the air lock 6. The air lock has piping oriented in three orthogonal dimensions and water may flow in either direction within each of the three dimensions; Applicant has discovered that this device prevents air from coming back into the drain hose no matter in what orientation the air lock lies. In other words, this feature essentially creates a reliable siphon so that the hose can go up over various obstacles before discharging outdoors. At the same time, the air lock on the discharge end allows one to valve the flow at the upper end of the siphon (or even temporarily shut it off completely) without having air come up the line and render the siphon inoperative.

Figure 4:
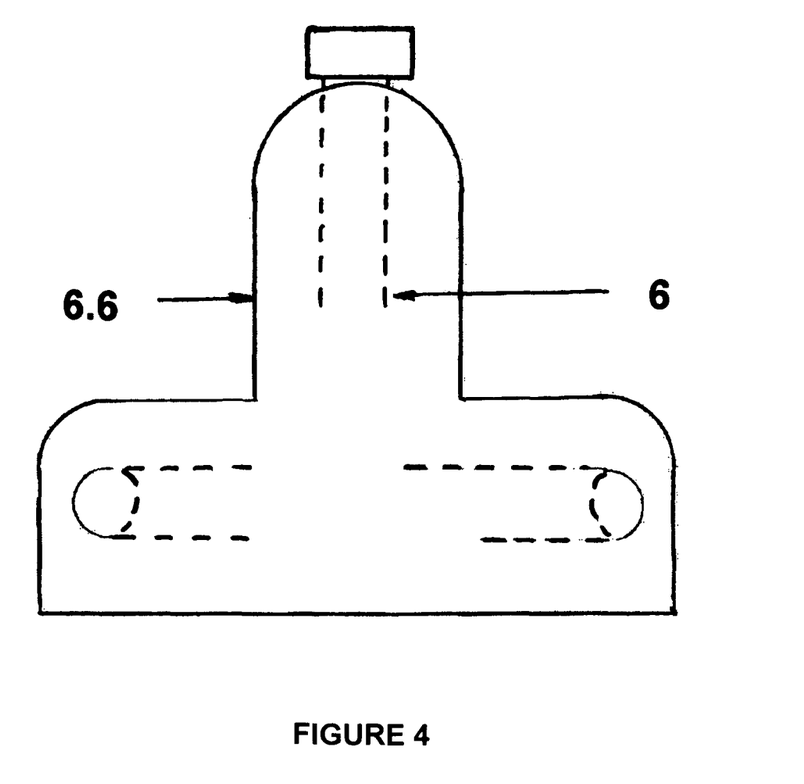
FIG. 4 is a schematic diagram of the outlet line and airlock arrangement in accordance with another example of the invention.
Figure 5:
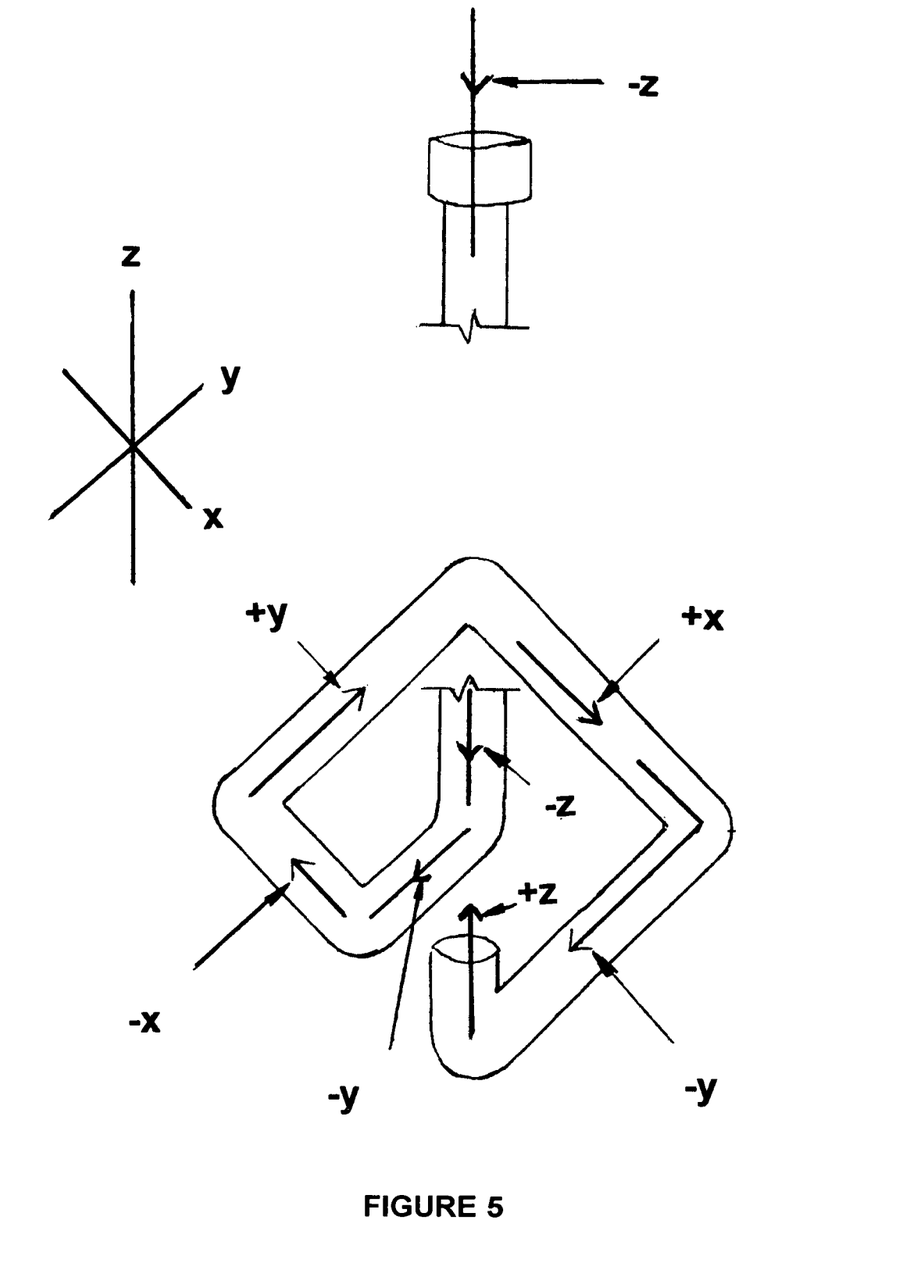
FIG. 5 is a detail drawing of one suitable configuration of the airlock arrangement in accordance with another example of the invention.

Applicant has found that the performance of the flow sink is significantly improved by the inventive air lock 6, because one cannot always insure that the drain hose has a completely downhill path to the outdoors. Thus, the invention relies to some degree on the siphoning action established in the drain line.

The following examples will describe individual elements and aspects of the invention in order to give the skilled artisan a clearer understanding of the construction and operation of the invention. It will be understood that these are exemplary only and are not intended to limit the scope of Applicant's invention, which is limited only by the claims.

EXAMPLE

The wash water container 1 may be of any suitable size and shape, and may be constructed of any suitable material. It should be large enough to allow the user to place one or both hands into the water, and deep enough to provide adequate space for rinsing objects such as rags, sponges, or the like. The upper size limit is dictated strictly by convenience of use: if the container is very large, portability will be adversely affected, and if the container is too deep, it will be inconvenient for the user to reach into it when the user is working on the floor next to the bucket. Applicant has found that a plastic bucket with a capacity of 3 to 5 gallons is particularly suitable.

A carrying handle 12 may consist of a metal wire type handle as is seen on conventional 5-gallon buckets, as shown in FIG. 1A or the handles may be affixed rigidly to the sides of the bucket or injection molded into the bucket itself.

EXAMPLE

Several interacting components serve to manage the amount of water in the bucket 1. The inlet and outlet valves allow one element of control, as the user can reduce the outflow of wastewater through the drain line so that water is replenished at an appropriate rate for the amount of sediment being created in the bucket. Here is where the inventive airlock 6 plays an important role, viz., by allowing the drain line to retain its function as a siphon even under very low flow (or zero flow) conditions, without running dry and having to be primed again.

EXAMPLE

It will be understood that fine sediment is intended to be flushed out in the wastewater, but it is desirable to prevent larger debris from entering the outlet line, as these objects might clog the valve or the airlock. For this reason, a coarse filter 3.4 is preferably placed upstream from the outlet line. The coarse filter may comprise a screen or mesh of any suitable size, a plate with small slots, etc., or may comprise a number of holes drilled through the wall of the bucket where the outlet line will be attached. Plastic or metal screen may be attached on the inner wall of the bucket or incorporated into the bung adaptor assembly 3 as shown schematically in FIG. 7. Bung adaptor 3 includes a lip 3.1, and gasket 3.2 to seal against the bucket when nut 3.3 is secured. In any case, it will be appreciated that the appropriate size for the coarse filter will be large enough to allow the normal sediment to pass without creating an undue restriction in the outlet flow rate, but smaller than the smallest diameter of the components in the outlet line. Applicant has found that a coarse filter that excludes debris larger than about 3/16 inch is suitable for many applications.

EXAMPLE

Figure 2:
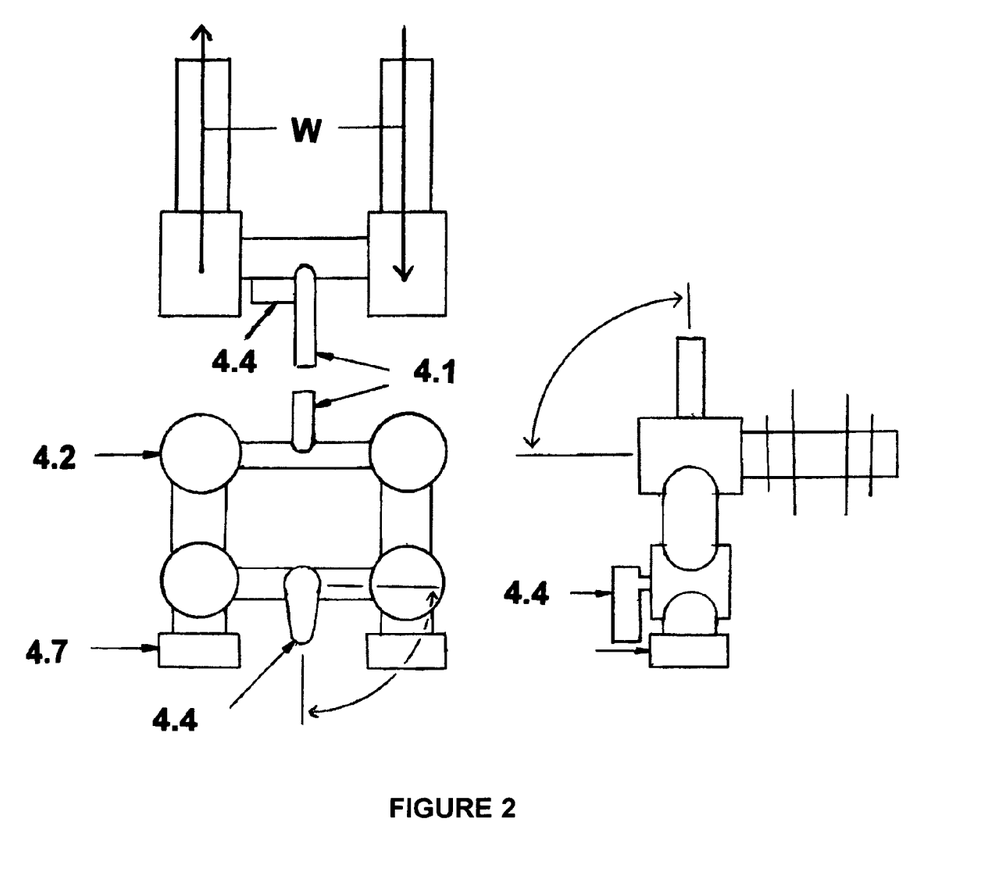
FIG. 2 presents three orthogonal views of one valve arrangement in accordance with another example of the invention.

One convenient way to control inlet and outlet flows is to use a standard unitary valve assembly 4.2 having two valves and a common controlling lever 4.1. Standard hose fittings 4.7 are provided to connect the hoses for water inlet and outlet lines. Such valves are commonly used for washing machines to allow both hot and cold water lines to be opened or closed in tandem. One such unit is the Oatey single lever valve Model No. 38826.

Figure 3A:
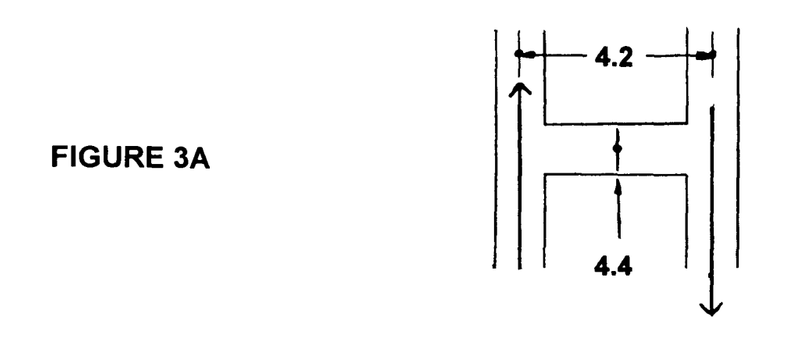
FIG. 3A represents flow during normal operation.
Figure 3B:
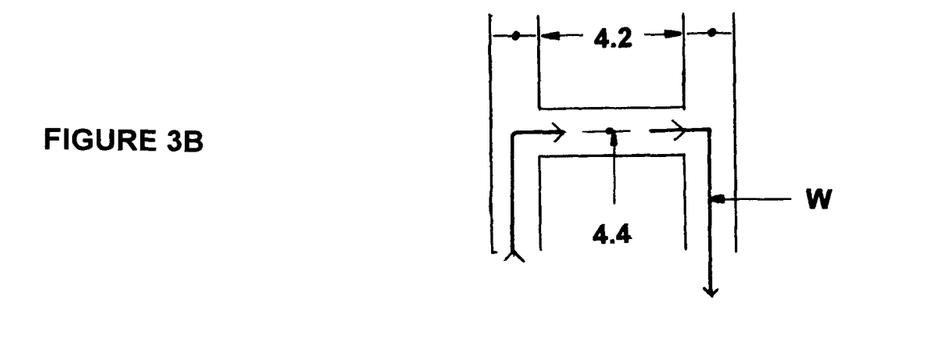
FIG. 3B represents flow during priming of the outlet line (siphon)
Figure 3C:
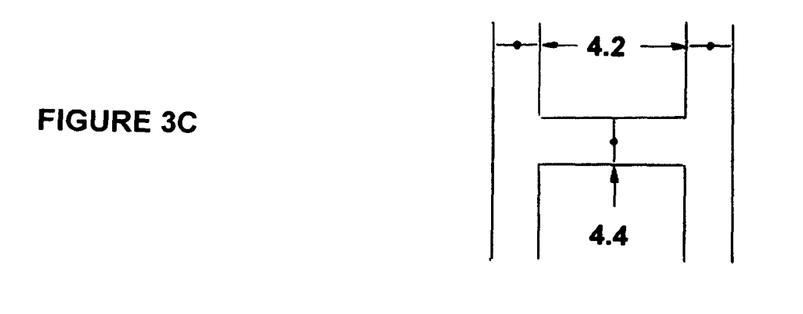
FIG. 3C represents standby with all valves closed.

FIG. 3 illustrates the water flow path W under various operating states. FIG. 3A shows normal operation with inlet and outlet valves 4.2 open and priming valve 4.4 closed. FIG. 3B shows the priming step with inlet and outlet valves 4.2 closed and priming valve 4.4 open. FIG. 3C shows the unit in standby mode with all valves closed and no water flowing.

EXAMPLE

Figure 6:
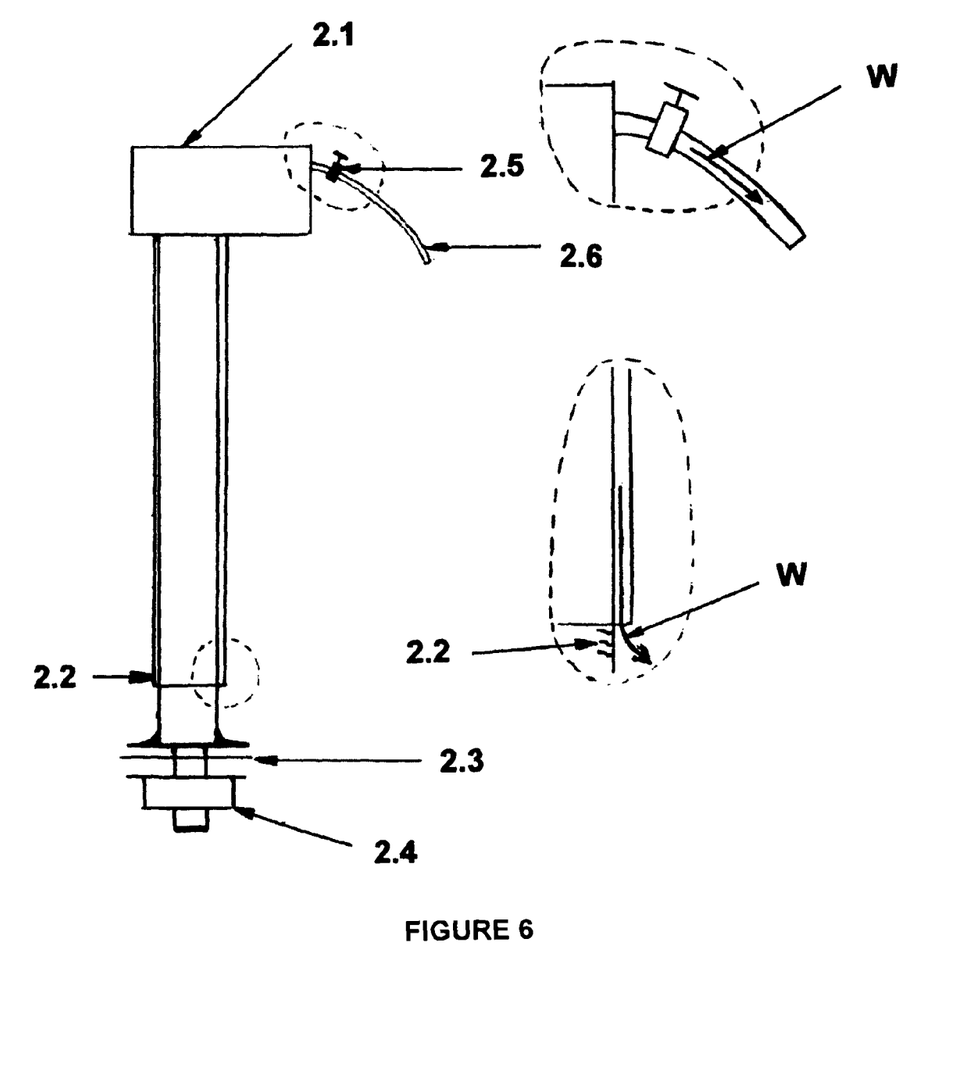
FIG. 6 is a schematic diagram of one configuration of the water level control system in accordance with another example of the invention.
Figure 7:
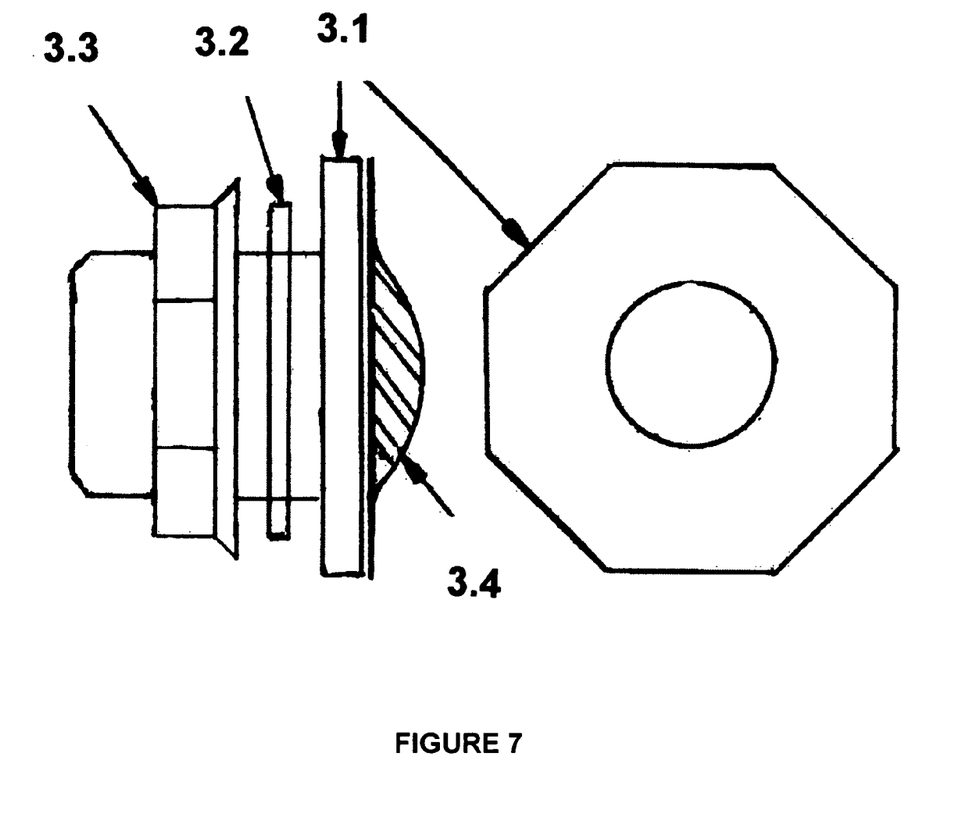
FIG. 7 is a schematic diagram of one example of the wastewater bung adaptor in accordance with another example of the invention.

It will be appreciated that further flow control is desirable, for two reasons. First, some water may be lost as the user moves rags or sponges into and out of the container. Second, the inlet line is under significantly higher pressure than the outlet line, which operates strictly by siphon forces. Thus, Applicant has found it helpful to add a level control or float valve 2. Many such float valves are known in the art; Applicant has found that level control valves used in commodes are easily adapted for this purpose. The level control is preferably one that is compact and does not require a long float arm. One suitable valve is the Korky Universal Fit Adjustable Toilet Fill Valve, Model No. 528 MPK. The float valve is attached to the bottom of the bucket with gasket 2.3 and nut 2.4 forming a water-tight seal.

The exemplary float valve, as is typical, discharges water from two points, first, near the bottom 2.2, and second, near the float 2.1, as shown generally in FIG. 6. (The skilled artisan will note that this second outlet is normally intended to provide a small amount of water to refill the bowl when the valve is used in its conventional role in a commode.) Applicant has discovered that valve 2.5 and water line 2.6 may be further added to effectively provide a small faucet to provide a source of clean water for the user to wash the hands, clean tools, or other purposes.

The invention relies on a siphon effect to keep wastewater flowing out. It will be appreciated that most contemplated uses for the device are inside a building, which might be new construction or a building that is already occupied. The wastewater line must therefore run some distance through the building before placement in a suitable discharge area, which is preferably outdoors or might be a drain within the building at a lower level. But the siphon must accommodate various obstructions in the downhill flow path. Users of siphons are well aware that a siphon frequently fails (i.e., runs dry) if the flow rate diminishes for any reason, which leads to the ingress of air from the discharge end. Because many contemplated uses of the invention will involve reducing the outlet flow, Applicant has developed a novel airlock device, which has been found to eliminate the aforementioned failure of the siphon under low flow conditions.

EXAMPLE

Referring to FIGS. 4 and 5, the airlock device 6 is preferably contained within a protective housing 6.6. The housing protects the tubing from being damaged or bent and also prevents the tubing from catching on various obstructions on the ground as the siphon hose moves about during the normal course of operating the system. The housing may be rigid molded plastic or any other suitable material.

Contained within the housing is a series of bends creating a tortuous flow path as shown in FIG. 5. In one example, conventional ½ inch copper pipe is cut into segments about 1.5, 3, and 6 inches long, which are joined together via standard 90° elbows to form a unit in which water may flow in both positive and negative directions in three orthogonal axes. This effectively keeps the siphon from filling with air no matter in which direction the airlock lies on the ground.

Applicant has discovered through experimentation that the airlock device as shown is substantially omnidirectional in that it functions regardless of its orientation on the ground. This is a very important property because it will be appreciated that a flexible hose may adopt any number of generally uncontrolled attitudes when cast upon the ground, depending on the local slope or flatness of the ground, how the hose was twisted in securing the connection to the valve, and how the hose is moved from time to time to get around obstructions and as the sink itself is moved about the workspace. The reliability of the siphon is thereby maintained with minimal user attention.

It will further be appreciated that the inventive airlock functions in a way that is completely different from the functioning of the familiar gas traps placed in drain lines, whose role is simply to retain a small volume of water to prevent gas from the sewer line from passing upward into a sink or other fixture. Conventional gas traps cannot serve the purpose of Applicant's omnidirectional airlock, nor are they intended to do so.

EXAMPLE

The inventive siphon and air lock described above could find numerous uses in its own right. Some exemplary situations include where there is the need to have pond control, water level control in a basement, etc. As long as there is a hill or lower level, lower than the water needing to be relocated, the air lock can be placed to drain water. The airlock is placed at the outlet end of a suitable hose, and a valve is placed at or near the inlet end. The hose is filled with water initially (using a garden hose faucet or other suitable means) and the valve is closed. The inlet end is placed into the body of water to be drained and the valve may thenceforth be opened, partially closed, or completely closed and the siphon will continue to be available for use without the need for priming again, as long as the water level in the body of water does not fall below the inlet when the inlet valve is open. As long as the intake end of the line remains under water there will always be suction in the line. Although it is contemplated that the valve will normally be toward the inlet side, it will be understood that the air lock allows the client to place the control valve anywhere on the line.

The flow sink may be used for many purposes. As one example, it is especially useful when installing tile or similar materials, where there is a need to wash away excess grout. Using a conventional bucket, this is a tedious process involving frequent water changes. The steps involved with the conventional method may be described as follows for the specific case of grouting freshly laid tile:

1. Prepare grout in one bucket.
2. Go outside to fill another bucket (cleaning bucket), preferably five gallon, with four gallons of water.
3. Place three or more sponges in the cleaning bucket.
4. Using a float, push the grout between the tile of a selected area (typically a 2 foot×2 foot area).
5. Use sponge #1 to wipe up the initial grout.
6. Use sponge #2 to wipe more of the excess grout.
7. Use sponge #3 to wipe haze off of tile.
8. Use sponge #4 to clean tile and if needed sponge #5 to completely clean tile.

At this time the water is dirty and, depending on the color, may need to be changed (recalling that some grouts contain significant amounts of pigment). If change is not needed steps 1 through 8 can be repeated one more time before water will need to be changed. Depending on the situation the dirty bucket of water will have to be carried through the building, possibly down stairs, over some trip hazards like rugs, etc. This creates the risk of spilling the water inside the building, causing water damage, staining the floors or carpets, etc. If the user makes it safely outside to change the water, here are the steps taken.

9. Pour the water out, saving the sponges.
10. Rinse out the sponges.
11. Rinse out the bucket.
12. Refill the bucket with clean water.
13. Place sponges back into bucket.

At this time the user must carry the bucket back through the building, again being concerned about spilling the water. The cycle continues until the grouting is complete. It is important to note that the wastewater cannot be safely disposed of by dumping into a sink, toilet, or the like, because the grout can cause clogs in the drain lines and lodge in the J-traps. One can easily see the inherent difficulty of the conventional process.

EXAMPLE

Using the inventive flow sink, the same job may be done using the following simplified workflow.
1. Prepare grout in one bucket.
2. Place flow sink in the immediate work area and connect the inlet line to a faucet and run the outlet line to a suitable location outdoors. Open the inlet valve to fill the bucket. Use the priming valve to fill the outlet line with water.
3. Place one or more sponges in the flow sink.
4. Using a float, push the grout between the tile of a selected area (typically a 2 foot×2 foot area).
5. Use sponge(s) to clean the grout, rinsing as needed in the flow sink, using inlet and outlet valves to replenish the water as needed.
6. When the job is finished, shut off the inlet water and drain all the water from the system.
7. Carry the empty bucket back outside.

One can see the advantages of the invention in saving time and effort while greatly reducing the risk of a mishap.

It will be appreciated that the invention may easily be adapted for other uses, as described in the following examples.

EXAMPLE

As noted, the flow sink may be of any convenient size and shape. It may be adapted with accessories such as a mop wringer, for example. Also, a double-sink configuration might be advantageous for some situations. Also, a T-adaptor could be installed to convert two individual flow sinks into a tandem arrangement. The container could also be collapsible or flexible to some degree for greater portability, use in camping or military settings, etc.

EXAMPLE

It will be understood that the water supply may be connected to either hot or cold water lines, depending on the particular needs of the user.

EXAMPLE

A larger sink could be equipped with a submersible pump if the only suitable discharge area lies uphill from the workspace. The sink could further be equipped with a mechanical agitator for washing clothing and the like. The agitator may be driven by an electric motor or by the pressure of the incoming water.

EXAMPLE

The sink may be equipped with various means to trap or filter solids, rather than discharging them in the wastewater stream. This would be particularly useful when cleaning painting equipment, for example.

EXAMPLE

The sink may further contain a means for dispensing soap or detergent, for situations where the user might wish to wash an area with a selected soap, disinfectant, or whatever, and then purge the soapy wastewater and switch to clear water for a final rinse and cleanup. It may further contain a supply of any selected water additive, such as household ammonia (ammonium hydroxide), chlorine bleach, muriatic acid, etc., which may be automatically metered into the water at a selected rate or may be periodically dispensed by the user as needed.

I claim:

1. A portable sink comprising:
a container for holding wash water;
an inlet line to bring fresh water into the container and having an inlet line valve;
a float valve on said inlet line to maintain said wash water at a selected level within the container, said float valve positioned to receive water from said inlet line valve;
an outlet line to remove wastewater from the container, said outlet line having an outlet line valve and further comprising a siphon to draw said wastewater from said container through said outlet line valve to a selected discharge location, said siphon further comprising an omnidirectional airlock device at its discharge end to prevent the ingress of air under conditions of less than maximum flow.

2. The portable sink of claim 1 wherein said container comprises a bucket including a carrying handle and a plurality of casters.

3. The portable sink of claim 1 wherein said inlet and outlet line valves comprise a unitary assembly so that the inlet and outlet flow rates may be increased or decreased in tandem.

4. The portable sink of claim 1 wherein said omnidirectional airlock device comprises a length of tubing having a plurality of bends creating water flow paths in three orthogonal directions so that ingress of air is prevented regardless of the orientation of said airlock in space.

5. The portable sink of claim 1 further comprising a separate priming valve to temporarily direct water from said inlet line into said siphon to prime said siphon for use.

6. The portable sink of claim 1 further comprising a filter to prevent debris greater than a selected size from entering said outlet line.

* * * * *